Jan. 6, 1948. R. D. NUTTING 2,434,079
DIELECTRIC MATERIAL AND METHOD OF MAKING SAME
Filed April 27, 1945 2 Sheets-Sheet 1
Fig. A.
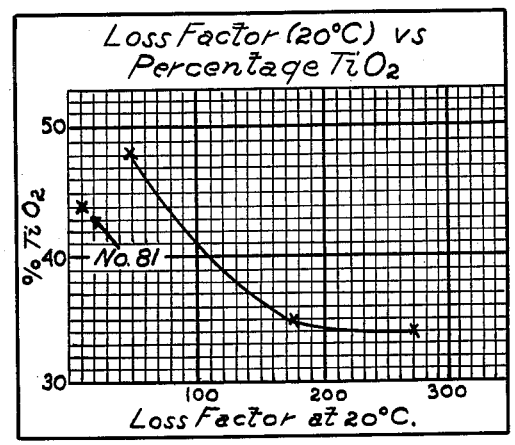
Fig. B.
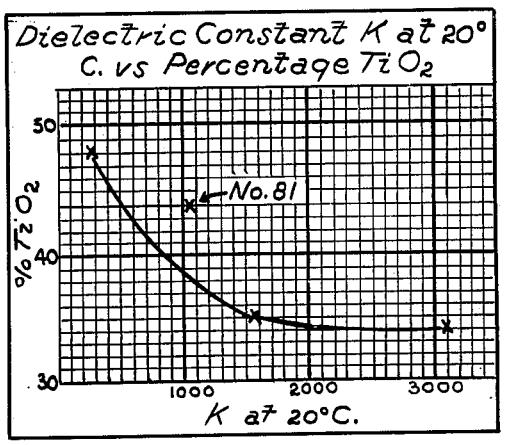
Fig. D.
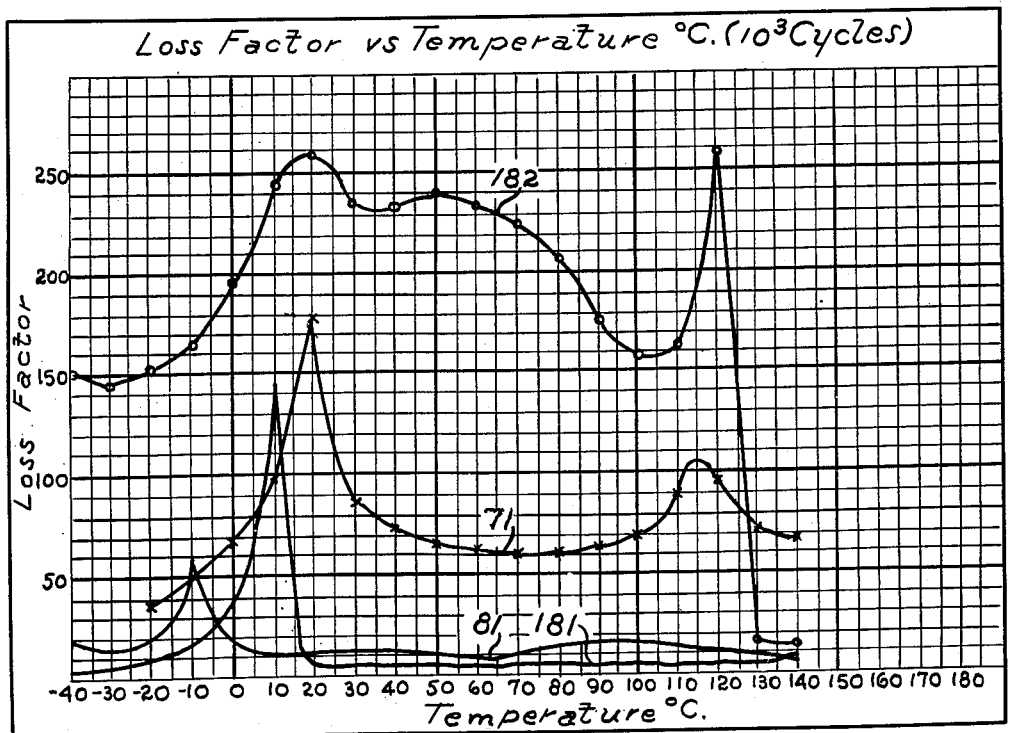
INVENTOR.
Robert D. Nutting
BY Arthur T. Davenport
ATTORNEY.

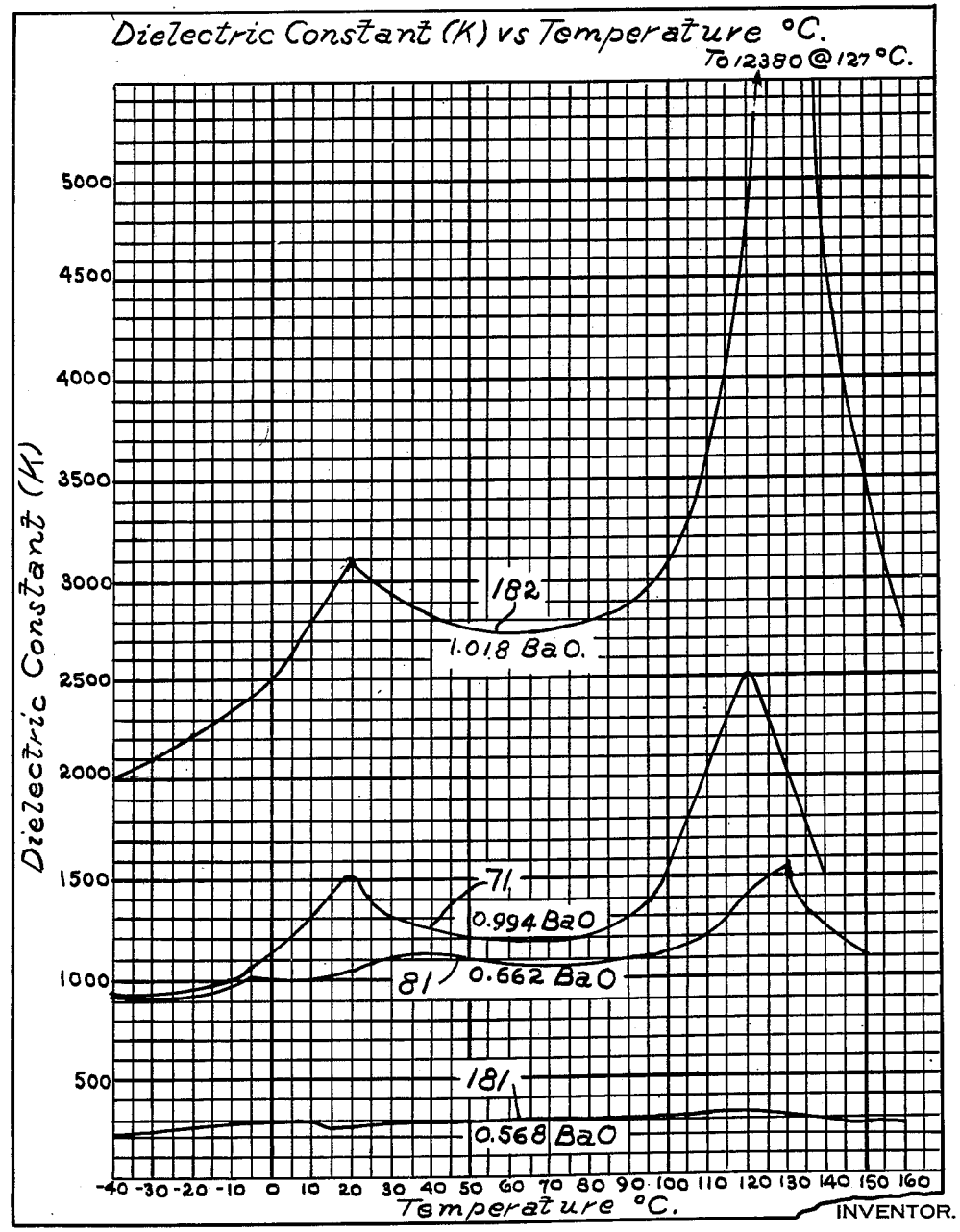

Patented Jan. 6, 1948

2,434,079

UNITED STATES PATENT OFFICE 2,434,079

DIELECTRIC MATERIAL AND METHOD OF MAKING SAME

Robert D. Nutting, Marshallton, Del., assignor to E. I. du Pont de Nemours & Company, Wilmington, Del., a corporation of Delaware Application April 27, 1945, Serial No. 590,584

8 Claims. (Cl. 106—39)

This invention relates to the process of manufacture of ceramic dielectrics of high dielectric constant and low loss factor and to an improved dielectric material comprising titanium oxide and an alkaline earth oxide in chemical combination.

Titanium oxide has found favor as a dielectric material due to its satisfactory dielectric constant, low power loss, and other desirable properties, and substantial quantities are being used in the manufacture of condensers and other electrical equipment. The titanates of divalent metals such as barium, strontium, calcium and magnesium have also found application in this field. Barium titanate is of particular interest and possesses a much higher dielectric constant than does rutile titanium dioxide. A disadvantage of barium titanate, however, is the variation of dielectric constant with temperature and the same is true of the loss factor. This variable performance with temperature change is particularly objectionable when the product is to be used in radio circuits mounted in airplanes. Such radio equipment should perform well with changes of temperature as great as 150–200° F. from the flying field temperature to the high altitude temperature, and this application requires the minimum variation in the properties of the dielectric under such changing atmospheric temperature conditions. One solution of this problem has been the use of a composition comprising both barium titanate and titanium dioxide. This product gives a generally uniform dielectric constant over a wide temperature range but has the deficiency of showing a wide variation in loss factor in going from 0° C. to 20° C., a highly important temperature range.

Overcoming these deficiencies of prior art dielectric materials is an object of this invention, which is directed to the production of alkaline earth titanate compositions having a lower loss factor and a higher dielectric constant than is possessed by compositions of similar chemical analysis prepared by prior art methods. A further object is the production of a dielectric material containing more titanium oxide than is shown by the formulation $XTiO_3$ where X represents a member of the group consisting of calcium, strontium, barium and magnesium. A still further object is the production of a titanate-titanium dioxide composition characterized by uniform performance over a wide range of temperature. Further objects will appear hereinafter.

The aforementioned and other objects are realized by the practice of my novel process which comprises the addition of a substantially pure oxidic compound of a divalent metal with a substantially pure oxidic compound of titanium in substantially chemically equivalent amounts and calcining the two to effect combination or the formation of the titanate of divalent metal. This titanate is then leached with a dilute acid yielding a soluble salt of the divalent metal thereby reducing the alkalinity of the titanate to substantial neutrality. The leached material is filtered, washed and dried and may be used in the manufacture of dielectric bodies such as radio condensers and the like.

This invention is particularly useful in the preparation of barium titanate containing dielectric material and accordingly will be described in terms of this particular composition. The starting materials may suitably be barium oxide, barium hydrate or barium carbonate, since these compounds of barium yield barium oxide upon calcination, in a form which is reactive with titanium oxide at elevated temperatures. Since condenser substances and dielectric material in general are highly sensitive to the detrimental effect of impurities, it is scarcely necessary to point out the importance of control of impurities in the starting materials, particularly in the barium compound. The titanium component should be in a finely divided condition and in a reactive form and these qualifications are met by use of purified hydrolysates such as are regularly produced in the pigment industry. These hydrolysates contain absorbed sulfuric and phosphoric acids which may be removed by addition of an alkali such as caustic soda or ammonia. Care should be taken, as already stated, to eliminate all injurious impurities and for this reason it is generally wise to restrict the treating agents to chemicals which are volatilized during subsequent operations. This is mentioned as ammonium hydroxide will in most instances be preferred over other alkaline treating agents.

The alkaline earth compound and the titanium compound may be mixed together in various ways although I prefer wet blending so as to insure intimate mixing of the reactants. In the event that a titanium oxide hydrolysate is used as the source of titanium and barium hydrate as the source of barium, it is advisable to add these reactants to water and digest at an elevated temperature for sufficient time, say two hours, to effect the formation of barium titanate. Barium hydroxide under these conditions reacts with titanium oxide in finely divided condition to produce barium titanate and this barium titanate is readily filtered and calcined to produce the material for the next step in the process.

The barium titanate which has been subjected to a temperature of 900° to 1100° C. or higher is then leached with a dilute acid to remove a part of the barium oxide. The titanate prior to acid leach usually has a pH of about 11 and after leach a pH of about 7. The leaching effects a reduction in the $BaO:TiO_2$ ratio from 1:1 to 1:1.5 although the possible leach ratio may contain from 1.25 to 1.75 mols of $TiO_2$ per mol of barium oxide. It is obvious that sulfuric acid may not be used for this purpose due to the insolubility of barium sulfate. The halogen acids have the disadvantage of forming nonvolatile barium compounds and accordingly these are not preferred leaching acids. Acetic acid is either volatile or decomposed in subsequent operations and is a preferred reagent, other organic acids may be used but acetic is preferred due to its availability and low cost. The leached barium titanate product is suitable for use by the manufacturers of electrical condensers and other dielectric equipment. It may be molded into desired shapes and fired to form a sintered ceramic body for use under the most exacting conditions.

The following examples are given as illustrative of my process and with the understanding that the exact chemicals used are merely representative and are not to be interpreted as a limitation of the invention.

EXAMPLE I

Normal barium titanate (barium meta titanate) was prepared by wet blending chemically equivalent amounts of barium carbonate and titanium hydrate. The latter was obtained through the hydrolysis of titanium sulfate solution followed by careful washing to eliminate water soluble impurities and followed by neutralization to 7 pH to remove adsorbed sulfuric acid. Ammonium hydroxide was used in this neutralization and the resulting ammonium sulfate in solution was removed by thorough washing on a filter. The blended mixture of barium carbonate and titanium hydrate was dried and calcined at 1000° C. to form the normal titanate. This product was then suspended in water after grinding to a powder and leached with dilute acetic acid at 30° C. for three hours to remove a portion of the barium oxide. The amount of acetic acid used was substantially more than that required to dissolve ⅓ of the barium oxide in the titanate. The product was again filtered and washed to remove the dissolved acetate and acetic acid. The resulting composition comprising barium titanate and titanium oxide is ready for shaping or molding into insulators or other articles such as elements of a condenser after which the shaped body is heated to sintering temperatures to develop its optimum physical properties. Electrical tests were made on the product which contained 1.5 mols of $TiO_2$ per mol of barium oxide.

EXAMPLE II

Barium meta titanate was made by slurrying a desulfated purified titanium hydrolysate in an excess of barium hydroxide and digesting the same at boiling temperature for one hour. The product was removed from the excess barium hydrate solution by filtration and washing procedure and then calcined at 1000° C. The resulting barium titanate was suspended in acetic acid as in Example I and the leached product containing substantially the same ratio of barium oxide to $TiO_2$ (1:1.5) was found to exhibit similar electrical properties as the product from Example I.

The results of tests of the product from Example I are given in the table below along with similar measurements for three products prepared by prior art methods and comprising titanium oxide and barium oxide in varying proportions. These results demonstrate the lowering of the loss factor by the present invention. (The technical terms and methods of testing used in this disclosure are described in A. S. T. M. Standards, Part III, starting on page 1148 (1942).)

Table I

| Sample No. | Per Cent $TiO_2$ | Loss Factor [1] | K [1] |
|---|---|---|---|
| 182 | 34 | 266 | 3,100 |
| 71 | 35 | 177 | 1,530 |
| 181 | 48 | 46 | 270 |
| 81 [2] | 44 | 10 | 1,050 |

[1] Measured at 20° C. and 1 kilocycle.
[2] Product of Example I.

The above data and results of other tests which have been made on my product and the other barium titanates are shown in the four figures which form a part of this specification. Figure A, shows graphically the location of the product of Example I containing 44% $TiO_2$ in comparison with the variation of loss factor with percent $TiO_2$, of other products prepared by prior art methods. Figure B shows the variation of the constant K with percent $TiO_2$ in respect to the other products and the product of Example I. It is apparent that the dielectric constant for the product of my process is greater than is to be expected from the percent of $TiO_2$. Figure C shows the variation of dielectric constant with temperature and while the dielectric constant of my product 81 is lower than that of samples containing smaller percentages of $TiO_2$, the curve is fairly uniform, irregularity being a serious objection in the products containing small amount of $TiO_2$ prepared according to prior art methods. Figure D shows the variation of the loss factor with temperature and it is apparent that in my product 81 except for the peak at about −10° C. the curve is fairly uniform. The loss factor is low and the effect of temperature is less marked than for the other products which are plotted for comparison.

As explained above, the product of this invention contains a greater amount of $TiO_2$ than is found in divalent metal meta-titanates due to the fact that some of the divalent metal has been removed by an acid treatment. This leaching may be performed at boiling temperature although temperatures as low as 30° C. or lower are useful but have the disadvantage of consuming greater periods of time. Acetic acid is employed as leaching agent in the example but other organic acids may be substituted. These optional choices include butyric, formic and propionic acid. Inorganic acids such as HCl and $HNO_3$ also may be used if steps are taken to remove injurious salts (e. g. barium chloride etc.).

The method of preparing the titanium ingredient is not considered extremely important and a wide variation is permissible. Titanium oxide may be obtained from various sources such as hydrolysis of titanium sulfate or chloride and may be calcined or used in the uncalcined state in the operation. It is also obvious that pure titanium oxide produced by the oxidation of titanium terachloride would be suitable, as the source of the titanium oxide is unimportant as long as purity precautions are taken. Furthermore, the titanium oxide may be in the amorphous condition or in the form of anatase or rutile crystalline powders in fine particle size. The divalent metal oxides may be used as well as the carbonates and this is true when calcium, strontium and magnesium compounds are substituted wholly or in part for the barium compound specifically mentioned in the above examples.

While the invention has been described for the preparation of a dielectric material comprising two oxides one of which is divalent and the other tetravalent it is to be understood that the invention may be used for the improvement of the electrical properties of other oxidic materials containing 3 or more oxides, provided the composition contains at least one divalent metal in substantial amount.

As many apparently widely different embodiments of this invention may be made without departing from the spirit and scope thereof, it is to be understood that it is not to be limited to the specific embodiments thereof except as defined in the appended claims.

I claim:

1. A ceramic dielectric comprising an alkaline earth metal titanate chemically degenerated to contain 25% to 75% more titanium oxide (molal basis) than is shown by the formula $XTiO_3$ wherein X represents a member of the group consisting of calcium, strontium, barium and magnesium.

2. A ceramic dielectric comprising an alkaline earth metal titanate chemically degenerated to contain 1.25 to 1.75 mol titanium dioxide to 1 mol of alkaline earth metal oxide.

3. A ceramic dielectric comprising a barium titanate chemically degenerated to contain 1.25 to 1.75 mol of titanium dioxide to 1 mol of barium oxide.

4. A ceramic dielectric comprising a barium titanate chemically degenerated to contain 1.5 mol of titanium dioxide to 1 mol of barium oxide.

5. A process of preparing a ceramic dielectric which comprises adding a substantially pure oxidic compound of an alkali earth metal to a substantially pure oxidic compound of titanium in molecular equivalent amounts, calcining the mixture to form a divalent metal titanate, leaching the titanate with dilute acid capable of forming a soluble salt therewith and washing to reduce the alkalinity of the titanate to approximately neutral condition, and finally forming and sintering the chemically altered titanate to form a dielectric article.

6. A process for preparing a ceramic dielectric which comprises leaching a normal alkaline earth metal titanate with an acid capable of forming a soluble salt therewith, to remove a portion of the alkaline earth oxide, thereby changing the molecular ratio of the titanate component oxides to within the range of 1.25 to 1.75 mols of titanium dioxide per mol of alkaline earth oxide, washing to remove the resulting alkaline earth salts and finally forming and sintering the chemically altered titanate to produce a dielectric article.

7. A process for preparing a ceramic dielectric which comprises leaching a normal barium titanate with an acid capable of forming a soluble salt therewith, thereby changing the molecular ratio of the titanate component oxides to within the range of 1.25 to 1.75 mols of titanium dioxide per mol of barium oxide, washing to remove the resulting barium salt, and finally forming and sintering the chemically altered titanate to produce a dielectric article.

8. A process for preparing a ceramic dielectric which comprises leaching a normal barium titanate with an acid capable of forming a soluble salt therewith, thereby changing the molecular ratio of the titanate component oxides to substantially 1 mol barium oxide to 1.5 mol titanium oxide, washing to remove the resulting barium salt, and finally forming and sintering the chemically altered titanate to produce a dielectric article.

ROBERT D. NUTTING.

REFERENCES CITED

The following references are of record in the file of this patent:

UNITED STATES PATENTS

| Number | Name | Date |
|---|---|---|
| 2,277,733 | Wainer et al. | Mar. 31, 1942 |
| 2,277,734 | Wainer et al. | Mar. 31, 1942 |
| 2,328,410 | Berge | Aug. 31, 1943 |
| 2,193,563 | McKinney | Mar. 12, 1940 |
| 1,436,164 | Moritz | Nov. 21, 1922 |
| 2,218,655 | Peterson | Oct. 22, 1940 |